United States Patent
Huster et al.

(10) Patent No.: US 11,493,653 B2
(45) Date of Patent: Nov. 8, 2022

(54) AMPLITUDE CONTROL FOR RESONANT SEISMIC SOURCE DEPTH EXCURSIONS

(71) Applicant: BP Corporation North America Inc., Houston, TX (US)

(72) Inventors: Andreas Huster, West Vancouver (CA); Joseph Dellinger, Houston, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 481 days.

(21) Appl. No.: 16/717,351

(22) Filed: Dec. 17, 2019

(65) Prior Publication Data

US 2020/0225375 A1 Jul. 16, 2020

Related U.S. Application Data

(60) Provisional application No. 62/790,882, filed on Jan. 10, 2019.

(51) Int. Cl.
| | |
|---|---|
| *G01V 1/04* | (2006.01) |
| *G01V 1/30* | (2006.01) |
| *G01V 1/38* | (2006.01) |
| *G01V 1/24* | (2006.01) |
| *G01V 1/00* | (2006.01) |

(Continued)

(52) U.S. Cl.
CPC ............. *G01V 1/245* (2013.01); *G01V 1/005* (2013.01); *G01V 1/04* (2013.01); *G01V 1/145* (2013.01); *G01V 1/30* (2013.01); *G01V 1/38* (2013.01); *G01V 2210/1234* (2013.01); *G01V 2210/6161* (2013.01); *G06F 9/542* (2013.01)

(58) Field of Classification Search
CPC . G01V 1/245; G01V 1/04; G01V 1/30; G01V 1/38; G01V 1/005; G01V 1/145
See application file for complete search history.

(56) References Cited

U.S. PATENT DOCUMENTS

| | | | |
|---|---|---|---|
| 9,983,324 B2 * | 5/2018 | Brenders | G01V 1/005 |
| 10,120,086 B2 * | 11/2018 | Harper | G01V 1/133 |

(Continued)

OTHER PUBLICATIONS

Partial PCT Search Report dated Apr. 9, 2020, for PCT/US2019/066821, filed on Dec. 17, 2019.

(Continued)

*Primary Examiner* — Ian J Lobo
(74) *Attorney, Agent, or Firm* — Conley Rose, P.C.

(57) ABSTRACT

A method of seismic exploration above a region of the subsurface of the earth containing structural or stratigraphic features conducive to the presence, migration, or accumulation of hydrocarbons comprises setting a tow depth of a resonant seismic source, producing a resonant frequency at a first amplitude with the resonant seismic source at the tow depth, detecting a depth excursion from the tow depth, reducing an amplitude of the mass from the first amplitude to a second amplitude, preventing the mass from contacting at least one of the first end stop or the second end stop based on reducing the amplitude to the second amplitude, correcting the depth excursion to return the resonant seismic source to the tow depth, and increasing the amplitude from the second amplitude to produce the resonant frequency with the resonant seismic source at the tow depth.

26 Claims, 6 Drawing Sheets

(51) Int. Cl.
*G01V 1/145* (2006.01)
*G06F 9/54* (2006.01)

(56) References Cited

U.S. PATENT DOCUMENTS

2011/0162906 A1  7/2011 Harper et al.
2016/0349393 A1  12/2016 Lambert

OTHER PUBLICATIONS

Robert Pool et al, The Wolfspar Field Trial: Design and Execution of a low-frequency seismic survey in the Gulf of Mexico, Aug. 27, 2018; XP055683447, pp. 91-96.

* cited by examiner

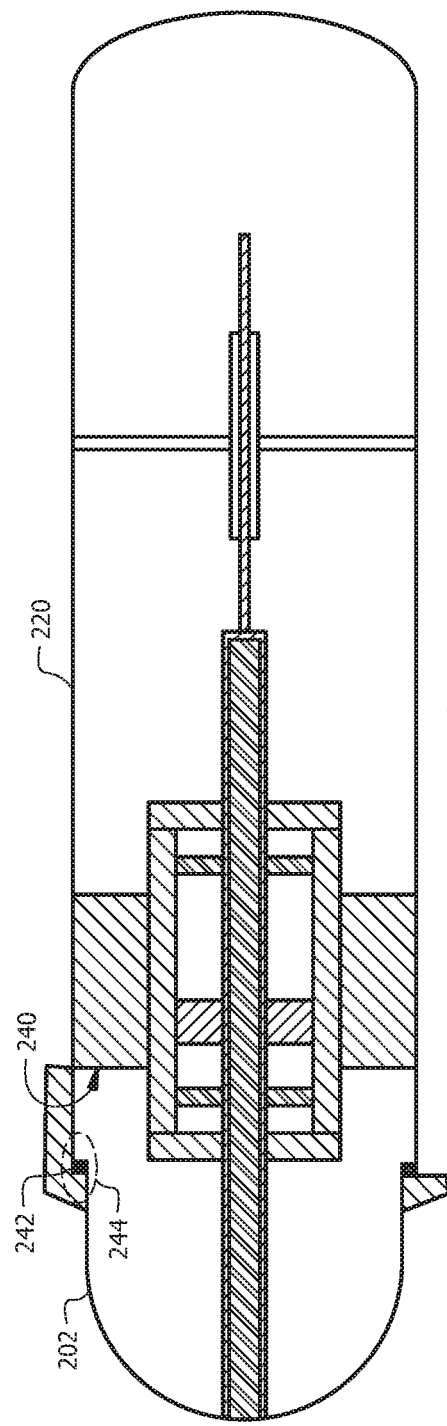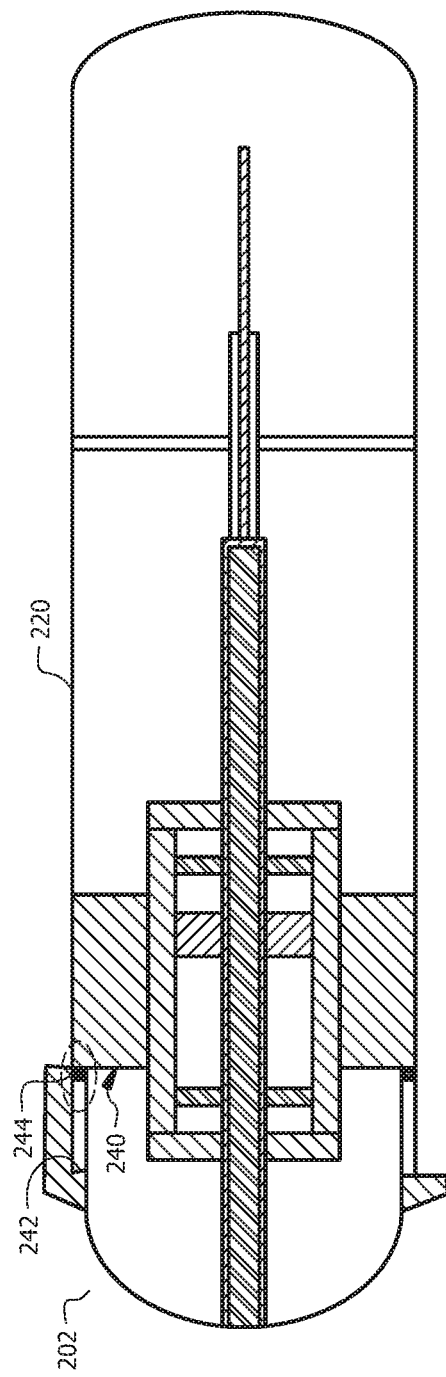

AMPLITUDE CONTROL FOR RESONANT SEISMIC SOURCE DEPTH EXCURSIONS

CROSS-REFERENCE TO RELATED APPLICATIONS

This application claims priority to U.S. Provisional patent application No. 62/790,882, filed with the United States Patent and Trademark Office on Jan. 10, 2019 and entitled "Amplitude Control For Resonant Seismic Source Depth Excursions," the disclosure of which is incorporated herein by reference in its entirety.

BACKGROUND

Seismic surveying is the practice of studying subterranean formations from reflections by the formations of acoustic waves. This includes imparting acoustic waves into a natural environment so that they may enter the earth and travel through the subterranean geological formations of interest. During their travels through the formations, certain features of the formations will reflect the waves back to the surface where they are recorded. The recorded reflections are then studied to ascertain information about those formations.

One type of seismic survey is the "marine" seismic survey. The term "marine" only indicates that the survey occurs in or on the water. It does not necessarily imply that the survey is occurring in a saltwater environment. While a marine seismic survey may occur in a saltwater environment, such as the ocean, it may also occur in brackish waters such as are found in bays, estuaries, and tidal swamps. They may even be conducted in wholly freshwater environments such as are found in lakes, marshes, and bogs.

SUMMARY

In some embodiments, a method of seismic exploration above a region of the subsurface of the earth containing structural or stratigraphic features conducive to the presence, migration, or accumulation of hydrocarbons comprises setting a tow depth of a resonant seismic source, producing a resonant frequency at a first amplitude with the resonant seismic source at the tow depth, detecting a depth excursion from the tow depth, reducing an amplitude of the mass from the first amplitude to a second amplitude, preventing the mass from contacting at least one of the first end stop or the second end stop based on reducing the amplitude to the second amplitude, correcting the depth excursion to return the resonant seismic source to the tow depth, and increasing the amplitude from the second amplitude to produce the resonant frequency with the resonant seismic source at the tow depth. The resonant seismic source comprises a mass moving between a first end stop and a second end stop at a first amplitude.

In some embodiments, a computer implemented control method for a resonant seismic source comprises receiving, by a controller, pressure readings from a pressure sensor coupled to a resonant seismic source, wherein the resonant seismic source is towed in a marine environment, determining, by the controller, a depth of the resonant seismic source based on the pressure readings, wherein the depth is within a depth threshold range, determining, by the controller, a change in the depth of the resonant seismic source to a depth outside of the depth threshold range, reducing, by the controller, an amplitude of a resonant frequency produced by the resonant seismic source in response to determining that the depth of the resonant seismic source is outside of the depth threshold range, determining, by the controller, a second change in the depth of the resonant seismic source from the depth outside of the depth threshold range to a depth within the depth threshold range, and increasing the amplitude of the resonant frequency produced by the resonant seismic source in response to determining the second change in the depth of the resonant seismic source.

In some embodiments, a method of seismic exploration above a region of the subsurface of the earth containing structural or stratigraphic features conducive to the presence, migration, or accumulation of hydrocarbons comprises producing a resonant frequency at a first amplitude with the resonant seismic source at a tow depth, detecting a depth excursion from the tow depth, determining an oscillation range of the piston based on the depth change, determine that the oscillation range exceeds the mechanical movement range, reducing an amplitude of the piston from the first amplitude to a second amplitude in response to determining that the oscillation range exceeds the mechanical movement range, preventing the mass from contacting at least one of the first end stop or the second end stop based on reducing the amplitude to the second amplitude, correcting the depth excursion to return the resonant seismic source to the tow depth, and increasing the amplitude from the second amplitude to produce the resonant frequency with the resonant seismic source at the tow depth. The resonant seismic source comprises a piston moving within a mechanical movement range of the resonant seismic source between a first end stop and a second end stop. While multiple embodiments are disclosed, still other embodiments will become apparent to those skilled in the art from the following detailed description. As will be apparent, certain embodiments, as disclosed herein, are capable of modifications in various aspects without departing from the spirit and scope of the claims as presented herein. Accordingly, the detailed description hereinbelow is to be regarded as illustrative in nature and not restrictive.

BRIEF DESCRIPTION OF THE DRAWINGS

The following figures illustrate embodiments of the subject matter disclosed herein. The claimed subject matter may be understood by reference to the following description taken in conjunction with the accompanying figures, in which:

FIG. 3 illustrates another schematic representation of a resonant seismic source according to some embodiments.

FIG. 4 illustrates still another schematic representation of a resonant seismic source according to some embodiments.

DETAILED DESCRIPTION

Figure 1:
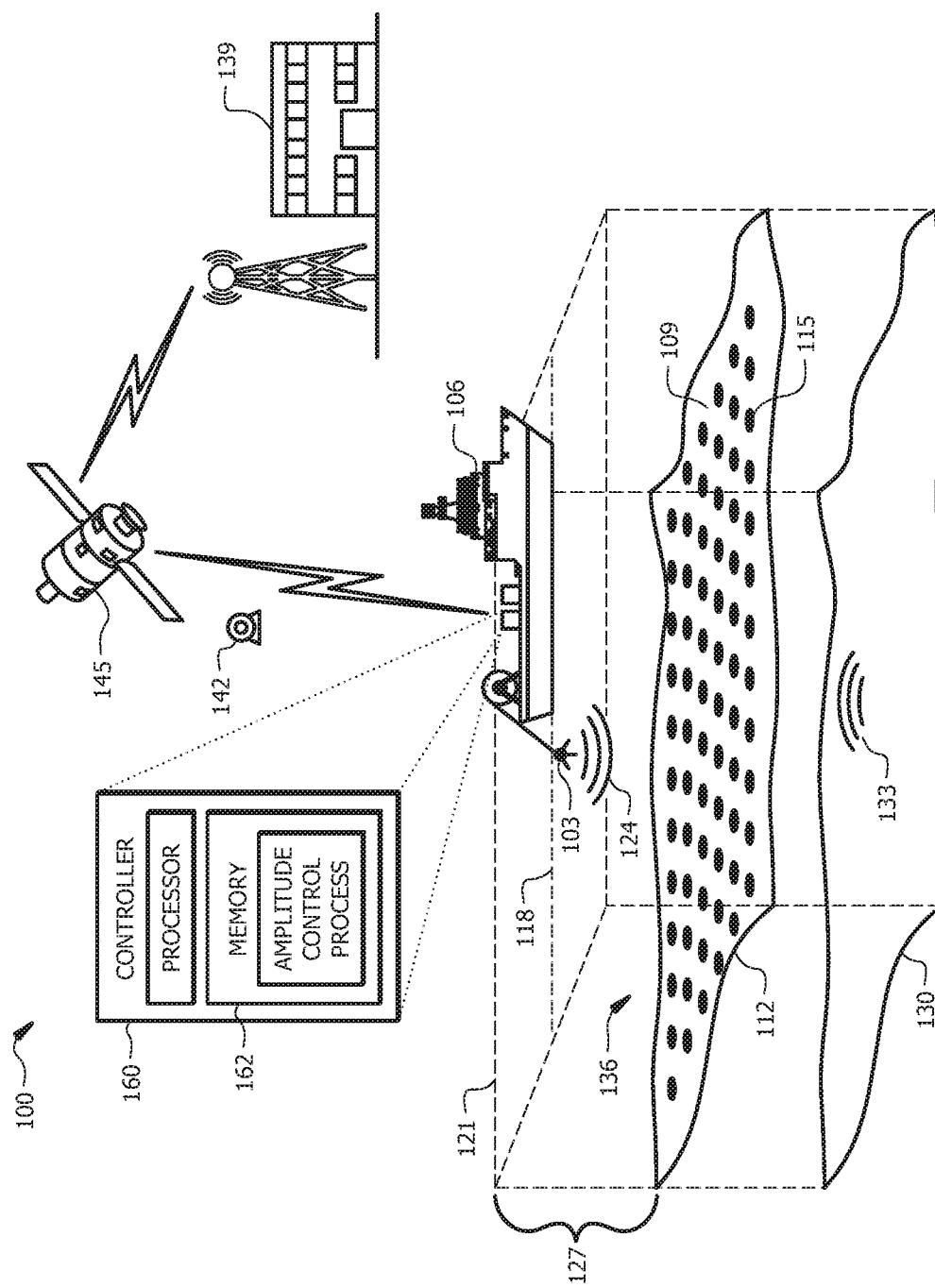
FIG. 1 illustrates the general environment of one or more embodiments.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . " The various characteristics mentioned above, as well as other features and characteristics described in more detail below, will be readily apparent to those skilled in the art with the aid of this disclosure upon reading the following detailed description of the embodiments, and by referring to the accompanying drawings.

One recent development in marine seismic surveying is the acquisition of "humming" data, i.e. data from a signal generated from a "humming" source. "Humming" is using a non-impulsive controlled-frequency source that generates substantially all of its energy at a single frequency or within a narrow frequency range. This is sometimes called a "monochromatic" or "near monochromatic" seismic source. Humming acquisition may occur in several different ways. For example, stepped humming is a sequential humming acquisition in which a single source steps over a set of two or more discrete frequencies, one at a time. The time spent moving between frequencies should be very small compared to the time spent at each frequency. Another example, chord humming, is acquisition in which one or more sources simultaneously hum at differing, discrete frequencies.

Another method of seismic surveying involves the use of a "low frequency" acquisition. The term "low frequencies" is understood within the present context, as frequencies below which getting sufficient signal to noise with conventional sources rapidly becomes more difficult as the frequency decreases (i.e. below about 6-8 Hz). In this context, "low-frequency" means frequencies less than about 6-8 Hz. Some embodiments will be below about 4 Hz, some of which may employ frequencies as low as about 2 Hz, or about 1.5 Hz, or about 0.5 Hz.

One example of a low frequency source that can sweep, or hum, or both sweep and hum, at low frequency is disclosed and claimed in U.S. Pat. No. 8,387,744 issued on Mar. 5, 2013 and entitled Marine Seismic Source, which is incorporated herein in its entirety. This particular source includes a tunable mechanical resonator, which together with a control system, comprises a self-excited oscillator. The control system applies a drive force with an actuator, causing the system to oscillate at or near its natural frequency. That frequency is controlled by varying the stiffness of a gas spring, so that the system can be caused either to oscillate at a single chosen frequency (i.e. to "hum") or over a continuous band of frequencies at some chosen rate (i.e. to "sweep"). Such a source can be referred to as resonant seismic source since it resonates at a natural frequency, whether or not the frequency can be controlled.

During use of the resonant seismic source, the source can be operated at or near its maximum amplitude (e.g., a measurement of the peak to peak motion of the piston within the source) in order to provide a response with a clear, and in some instances optimized, signal to noise ratio for a sourcing that lasts a given length of time. When the resonant seismic source operates at or near its maximum amplitude, the source can be especially sensitive to the tow depth, particularly when operating at low frequencies, such as those below about 2.5 Hz. At these low frequencies, the resonant device generally moves over its full allowable range of motion (e.g., a mechanically allowable range) for the device such that the motion of the device brings the piston or mass near the mechanical limits or stops. Since the devices operate in a resonant mode based on a balance between an internal pressure or force and the external pressure or force, a change in depth away from the nominal depth acts to displace the center of motion of the oscillating piston or mass, but not the overall range of the natural oscillation. A deeper tow depth results in a shift of the piston or mass inwards, and a shallower tow depth results in a shift of the piston or mass outwards. Such depth excursions can occur for a number of reasons such as a change in speed, rough seas, passing through changes in currents, and/or a control law in the heave compensation system that occasionally becomes unstable. If the resulting shift in the mechanical components occurs, and the resonant seismic source is operating at or close to its limits, the resulting change can result in the mechanical components exceeding their limits. In this situation, the oscillating piston can contact the mechanical limits or stops and cause damage to the device. Sensors within the resonant seismic source are generally configured to detect such a condition and to perform an emergency shutdown of the resonant seismic source to prevent mechanical damage to the device, and reinforced rubber end stops ensure that only an exceptionally hard collision would cause any damage.

In practice, unexpected stops are undesirable mostly because they interrupt the normal operation of the device, which can result in the need to re-perform the seismic survey over a portion of the formation (e.g., require one or more source points or lines to be reshot), which reduces the survey efficiency. One solution is to reduce the normal operating amplitude of the resonant seismic source to provide a greater safety margin in the mechanical movement of the components. At lower amplitudes, there is more room for depth errors while preventing emergency shutdowns. However, depth excursions can be relatively frequent and can occur over a range of motion such that the resulting reduced amplitude may not produce practical signal amplitudes for the survey. For example, depth excursions of two meters or more may result in a need to significantly reduce the amplitude from the maximum possible with the resonant seismic source. It is thus not desirable to continuously operate the device at an amplitude level so low that no likely temporary depth excursion will cause the device to perform a safety shutdown.

As proposed herein, the resonant seismic source can be operated at or near the maximum amplitude during normal operation at the nominal depth, and generally within a range of depths around the nominal depth, which can be referred to herein as a depth threshold range. As used herein the depth threshold range refers to a range of depths including the nominal depth along with a surrounding range of depths within a threshold of the nominal depth. In the event of a depth excursion, a control program can be implemented to automatically intervene and reduce the amplitude of the resonant seismic device to avoid any mechanical damage. The control program can continue to adjust the operating amplitude based on the detected depth and degree of depth excursion as needed to keep the device operating. An alert or alarm can be sent to the operator to indicate the depth excursion, and optionally a degree of the depth excursion. The operator or a depth controller can then correct the depth excursion on the fly without interrupting the device's continuous operation. Once the depth has been restored to the nominal depth or within the depth threshold range, the amplitude can then be increased to the desired level to provide an increased signal amplitude. Thus, the survey operation can continuously operate without the need for an emergency shutdown in most situations. While there may be a short period of lower than normal amplitudes, this may be preferable and may avoid the need for resurveying as compared to a more lengthy emergency shutdown with a full restart of the device.

FIG. 1 conceptually illustrates a marine seismic survey acquisition system 100 in accordance with some embodiments. The marine seismic survey system 100 can be used to perform a seismic survey using at least one low frequency seismic source 103 towed by a source vessel 106, where the low-frequency seismic source can include a resonant seismic source. It can also include a plurality of receiver lines 109 disposed upon the seabed 112. Each receiver line 109 includes several receivers 115. In general, receivers 115 may comprise any suitable type of seismic receiver including, without limitation, hydrophones, geophones, or combinations thereof. The nodes 115 may be independently placed, powered, and operated, or may be "nodes on a rope", or may be connected to or incorporated in an ocean-bottom cable (OBC). In other embodiments, the receivers will be in streamers towed beneath the sea surface behind the source vessel 106, and/or towed behind a separate vessel. When streamers are used, an electrical or fiber-optic cabling can be used to interconnect receivers 115 on each streamer and to connect each streamer to the towing vessel. Data may be digitized at or within the receivers 115 and transmitted to the towing vessel through the cabling at relatively high data transmission rates (e.g., rates in excess of 5 million bits of data per second). Ship-towed streamers and ocean-bottom nodes may also be used simultaneously. Receivers may also be tethered in mid water column, or free-floating, suspended from a mid-water-column cable, or located in a borehole.

During a survey, the source vessel 106 can tow at least one resonant seismic source 103. In some embodiments, the resonant seismic source 103 may be towed from the stern of the source vessel 106 in conventional fashion. However, in some embodiments, the resonant seismic source 103 can be towed from the side of the source vessel 106. The resonant seismic source 103 can be deployed below the ocean's surface 121, the optimal depth depending on a variety of factors including, without limitation, the sea conditions, the towing strength of the equipment, and the desired frequency range to be produced and recorded. For a low-frequency marine resonant seismic source producing acoustic energy in the range 2-8 Hz, for example, the tow depth of the seismic source can be at a depth between 30 meters and 60 meters.

During the acquisition phase of a seismic survey, the deployed resonant seismic source 103 can be warmed up, and the tow vessel 106 can tow it along the sail lines called for by the design. The resonant seismic source 103 can impart one or more seismic signals 124 into the water column 127 to encounter and penetrate the seabed 112 where the signals 124 interact with the subterranean formation 130. A portion of the signal reflects back from the seabed 112 to the sea surface. The portion penetrating the seabed will reflect as modified seismic signals 133 that propagate back to the receiver array 136 disposed on the seabed 112. The modified seismic signals 133 can be detected by the receivers 115 and recorded as seismic data. The recorded seismic data can then be communicated to a computing facility 139. This communication may be, for example, by hard copy on a magnetic tape 142, hard drive, or other storage device, or by transmission (e.g., via a satellite 145).

The presently disclosed systems and devices employ a resonant seismic source alone or in combination with other types of seismic sources. For example, when a seismic survey uses multiple sources over different frequency ranges, different types of sources (e.g., impulsive versus swept-frequency) may be used. In circumstances where swept-frequency devices are used, different types of sweeps (broadband or narrowband) may be provided by various seismic sources. Thus, there may be circumstances in which more than one type of source or mode of operation is used within a seismic survey.

Equipment aboard the vessel 106 can control the operation of resonant seismic source 103 and receivers 115, and in some embodiments (for example, when the receivers are located within streamers), may also record the acquired data. Seismic surveys provide data for estimating the distance between the ocean surface 121 and subsurface structures, which lie below the ocean floor 112. By estimating various distances to a subsurface structure, the geometry or topography of the structure can be determined. Certain topographical features and amplitudes of recorded seismic data can be indicative of oil and/or gas reservoirs.

It is during the generation and emanation of the seismic acoustic signals that the presently disclosed amplitude-control process operates. The resonant seismic sources and operational control of the sources due to depth excursions will now be described in more detail.

The presently disclosed amplitude control process is a control scheme for a resonant controlled-frequency marine seismic source employing a mechanical resonator. Because the marine seismic source is "resonant", it will tend to naturally oscillate at its resonant frequency. In general, the resonant seismic source can comprise a mass (e.g., a piston) having at least one free end that moves against the pressure of the seawater and an internal spring force. The resonant seismic source includes an excitation actuator that injects energy into this oscillation to help overcome, for example, friction and radiation losses. The excitation actuator or actuators can also control the amplitude of the resonance of the resonant seismic source, hereinafter referred to as the amplitude control technique or process. However, the amplitude of the acoustic output of the resonant seismic source may vary in an unintended manner owing to changes in the environment (such as changes in hydrostatic pressure) and/ or to changes in the internal state of the source (such as changes in its internal temperature). This unintended variation can be detrimental to the mechanical components in certain situations such as depth excursions of the resonant seismic source.

Figure 2:
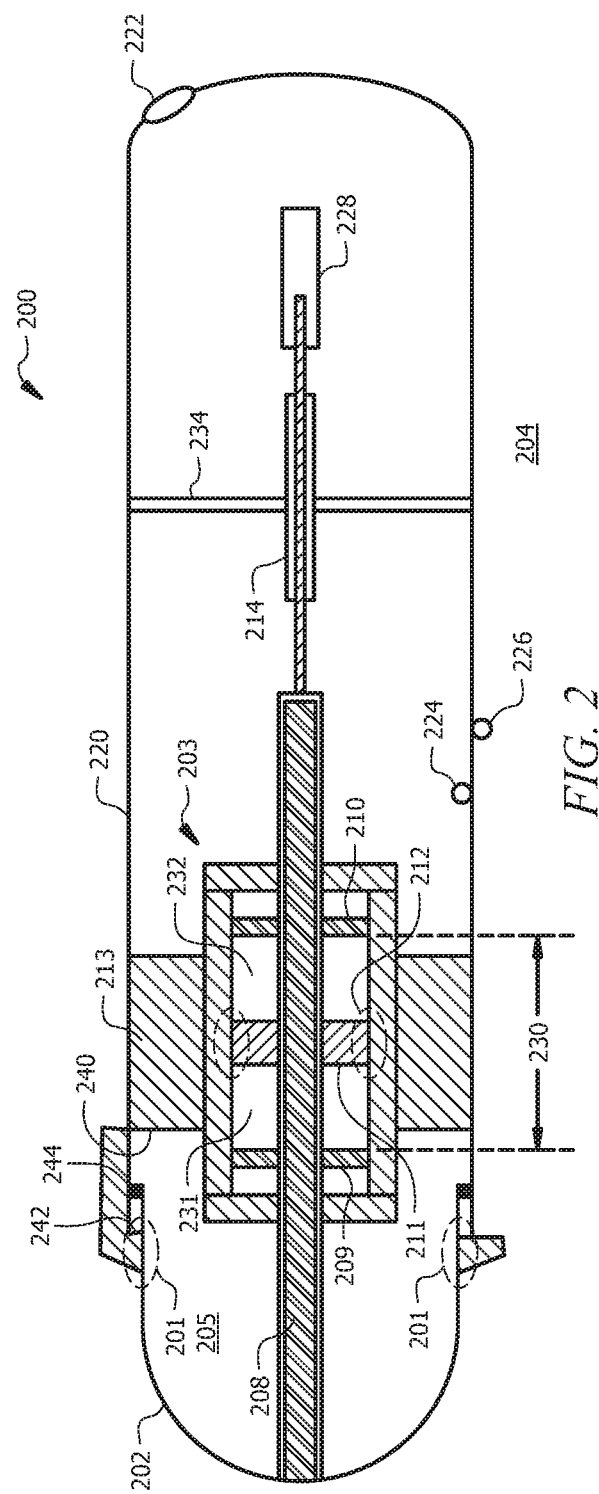
FIG. 2 illustrates a schematic representation of a resonant seismic source according to some embodiments.

A variety of resonant seismic sources can be used and controlled using the amplitude control scheme disclosed herein. For example, the resonant seismic source can comprise a reciprocating piston in the form of a rounded capsule and/or a single ended reciprocating piston, though other variations are also within the scope of the amplitude control scheme. An embodiment of a resonant seismic source is shown in FIG. 2. As shown, the resonant seismic source 200 includes a radially outer housing 220 having a reciprocating piston 202 coaxially received by housing 220. The housing 220 is sealed at the end opposite the open end that receives the reciprocating piston 202. In some embodiments, the housing 220 can include a plurality of through ports 222 that allow various supply lines such as compressed air supply line(s), hydraulic fluid supply line(s), and/or electrical connections (e.g., sensor cables, electronic control wiring, etc.) to pass through the housing 220 and into an interior of the housing 220. Addition& ports such as drain valves can be included in the housing 220 to allow any water entering the housing to be drained from the housing 220.

The piston 202 slidingly engages the cylindrical inner surface of housing 220 and extends axially from an open end of the housing 220. The piston 202 can axially reciprocate relative to the housing 220 to generate acoustic energy waves in the surrounding water. Together, the piston 202 and the housing 220 define a sealed interior chamber 205. The chamber 205 can be filled with a gas such as air or nitrogen.

The piston 202 reciprocates relative to the housing 220 within the limits of travel defined by inner end stops 240 and outer end stops 242. A shoulder 244 on the piston 202 can travel between the end stops 240, 242, and the outer limits of the travel are limited due to contact between the shoulder 244 and the surfaces of the end stops 240, 242. During normal operation, the shoulder 244 is not configured to engage the end stops 240, 242, and contact between the shoulder 244 and the end stops 240, 242 can result in damage to the piston 202, the housing 220, and/or other components of the source 200. A normal margin of safety can be defined by an offset distance between the shoulder 244 and the end stops 240, 242 during normal use. A position sensor such as sensor 228 or another sensor can be used along with the geometry of the source 200 to determine the position of the shoulder 244 relative to the end stops 240, 242.

FIGS. 3 and 4 illustrate the limits of operation of the piston 202 relative to the housing 220. For example, FIG. 3 illustrates the piston 202 displaced to its outermost limits. In this position, the shoulder 244 is engaged with the outer end stop 242 such that no further outward movement of the piston 202 is possible. Note that in this position, the piston 211 is not engaged with the squeeze piston 209 as described in more detail herein. FIG. 4 similarly shows the piston in its innermost position relative to the housing 220. In this position, the shoulder 244 is engaged with the inner end stop 240 such that no further inward movement of the piston 202 is possible. In this position, the piston 211 is not engaged with the squeeze piston 210. As a result, in some embodiments, the end stops 240, 242 define the limits of travel of the piston 202 relative to the housing 220.

Returning to FIG. 2, an annular seal 201 can be mounted to the inner surface of the housing 220 and/or an outer surface of the piston 202, and is radially positioned between the piston 202 and the housing 220. When the annular seal 201 is mounted on the inner surface of the housing 220, the annular seal 201 forms an annular dynamic seal with the piston 202 and an annular static seal with the housing 220. In other words, the seal 201 is stationary relative to the housing 220. When the annular seal is mounted on the outer surface of the piston 202, the annular seal 201 forms an annular static seal with the piston 202 and annular dynamic seal with the housing 220.

In some embodiments, the housing 220 can include a plurality of sensors 224, 226, 228. The sensor 224 can be an internal pressure sensor that detects and measures the pressure within the housing 220, the sensor 226 can be an external pressure sensor that detects and measures the pressure 204 outside of the housing 220 (i.e., the pressure of the surrounding water), and the sensor 228 can be a position sensor that determines the position of the piston 202. In some embodiments, a position sensor can be incorporated into a linear actuator 214 and may not be a separate sensor 228.

The piston 202 is configured to move with a displacement relative to the housing 220 against the pressure of the external seawater $P_{ext}$. At equilibrium, the piston 202 can be positioned so that the pressure inside the device is equal to the external pressure $P_{ext}$ and the piston 211 can be relatively centered between the squeeze pistons 209, 210. The piston 202 is attached to a shaft 208 that passes through a variable gas spring assembly 203. The gas spring assembly 203 is retained in position within the housing 220 by a squeeze piston mounting 213 that rigidly couples the gas spring assembly 203 to the housing 220. Attached to the shaft 208 is a piston 211 that moves freely laterally within the gas spring cylinder. The seal 212 around the perimeter of the piston 211 prevents gas movement around the piston 211, creating two sealed compartments on both sides, 231 and 232. Two laterally movable pistons 209 and 210, similarly sealed around their perimeters, allow the length 230 of the variable gas spring 203, and thus its stiffness, to be varied. The pistons 209 and 210 that determine the length 230 of the variable gas spring 203 can be referred to as "squeeze pistons" herein. The variable length of the gas spring 203, the total distance of the two gas spaces 231 and 232 between the two squeeze pistons, is given by the distance 230. The pressure inside the sealed squeeze-piston compartments 231 and 232 at equilibrium is $P_s$. A resonant piston-type marine seismic resonator such as the source 200 oscillates at a natural frequency that is determined by parameters such as the squeeze piston (209, 210) positions, the gas pressures inside the spaces 231, 232, 205, the outside 204 water pressure $P_{ext}$ (and hence the device operating depth), and to a lesser extent the seal frictions and the force and activation timing of, for example, an actuator, such as a linear actuator 214, that feeds energy into the oscillations of the radiating piston 202. The linear actuator 214 can be anchored to the housing 220 by one or more supports 234, and the linear actuator 214 can be slidingly connected or coupled to the shaft 208. The squeeze pistons 209, 210 control the stiffness of the variable gas spring 203 by changing the equilibrium pressure $P_s$ inside the gas spring 203. The combined stiffness of the variable gas spring 203 and the gas within the housing 220 in turn controls the resonant frequency of the resonator source 200.

To produce a seismic signal at a given frequency and/or to perform a frequency sweep, the squeeze pistons 209, 210 can be moved to change the oscillation period as required, but otherwise the device 200 is (for the most part) allowed to oscillate naturally. Typically, the required squeeze-piston positions can be calculated before the production of the seismic signal begins. The source 200 must be so designed that the squeeze pistons 209, 210 follow these trajectories despite perturbing forces produced by the movement of the shaft 208 and its attached pistons 202 and 211. As a particular example, the motions of the piston 211 can transiently change the pressures in the gas chambers 231 and 232, which without compensation would cause the squeeze pistons 209 and 210 to move in response. This may be achieved either by careful design of the mechanical system that actuates the squeeze pistons 209 and 210 or by means of the control system. It can be achieved via mechanical design by using extremely stiff actuation means to control their position, for example worm gears driven by servo motors, so that the deviation of the pistons 209 and 210 from their desired trajectories is negligibly small. Alternatively the same goal may be achieved by a default feedback control law that causes actuators to act to return the pistons 209 and 211 to their desired trajectories should they deviate. Such a default squeeze-piston control law, e.g., active stiffening, acts to keep the squeeze pistons 209 and 210 in their pre-calculated positions or trajectories despite the perturbing forces introduced by the device's operation.

During operation, the amplitude of the seismic signal can be controlled by the input provided by the linear actuator 214. While the system naturally oscillates, the linear actuator 214 is used to supply energy into the system to overcome frictional and radiative losses. When energy is supplied to the system, the piston 211 can continue to oscillate at a frequency determined by the position of the squeeze pistons 209, 210, where an energy input in excess of the frictional and radiative losses can increase the amplitude and an energy input below the frictional and radiative losses can decrease the amplitude. The amount of energy input into the system with the actuator 214 can determine the amplitude of the seismic signal that is generated at the given frequency. When the linear actuator ceases to provide energy into the system, the piston will continue to oscillate for some period with a decreasing amplitude over time until the piston eventually ceases to oscillate. Thus, the linear actuator can control the amplitude or volume of the seismic signal created by the source 200 based on an amount of energy input into the shaft 208, and thereby the piston system 202, 211.

While described herein in terms of the piston assembly shown with respect to FIGS. 2-4, the control systems and processes described herein are also applicable to other resonant seismic sources having travel limits. For example, the resonant piston assembly as described in U.S. Patent Publication No. 2011/0085422 to Thompson et al., which is incorporated herein in its entirety for all purposes, illustrates a piston type resonant seismic source having an internal gas piston that can travel within the limits set by the squeeze pistons and/or internal end stops. The examples provided herein have generally reflected operation of embodiments in a marine environment where the seismic source comprises a resonant gas spring (e.g., either a variable gas spring with its stiffness controlled by a squeeze piston, or a gas spring with its stiffness controlled by tow depth, or both of these in parallel). Those of ordinary skill in the art will also appreciate that the methods of this disclosure apply more generally to any tunable resonant seismic source. For the purposes of this disclosure, the term "tunable resonant seismic source" or "tunable seismic source" will mean any seismic source (land or marine) with an oscillation frequency intrinsic to the physical configuration of the device (i.e., resonant), and that the resonant oscillation frequency can be externally controlled in some manner, i.e. it is "tunable".

In general, the systems and processes described herein can be used with any resonant seismic source having any structures acting as an inner and outer end stop, where the present systems and methods can be used to help reduce or avoid damage to the resonant seismic sources due to depth excursions. For example, instead of a stiff gas spring driving the resonance, the device could incorporate a stiff mechanical spring, or the structure of the device itself could provide the necessary stiffness to resonate against the external water pressure. The device could derive its stiffness from an electro-mechanical resonant system such as a piezoelectric crystal coupled to an inductor and/or capacitor.

The operation of seismic source 200 can be affected by the depth of the seismic source, where the depth affects the external pressure, $P_{ext}$. During operation of the resonant seismic source at the nominal depth, the piston 211, can be relatively centered between the squeeze pistons 209, 210 based on a balance between the external pressure $P_{ext}$ and the pressure within the chambers 231, 232. When a depth excursion occurs, the balance between the external pressure and the pressures within the chambers 231, 232 can be altered such that the center point of the oscillations of the piston 211 can be offset relative to the center point of the squeeze pistons 209, 210. For example, when the source 200 experiences a depth excursion resulting in a greater operating depth, the external pressure, $P_{ext}$, can increase from the nominal external operating pressure. The higher external pressure can provide a greater inward force on the piston 202 such that the piston 211 may move inwards from the nominal position. Similarly, when the source 200 experiences a depth excursion resulting in a shallower operating depth, the external pressure, $P_{ext}$, can decrease from the nominal external operation pressure. The lower external pressure can provide a lesser inward force on the piston 202 such that the piston 211 may move outwards from the nominal position.

Figures 5A, 5B:
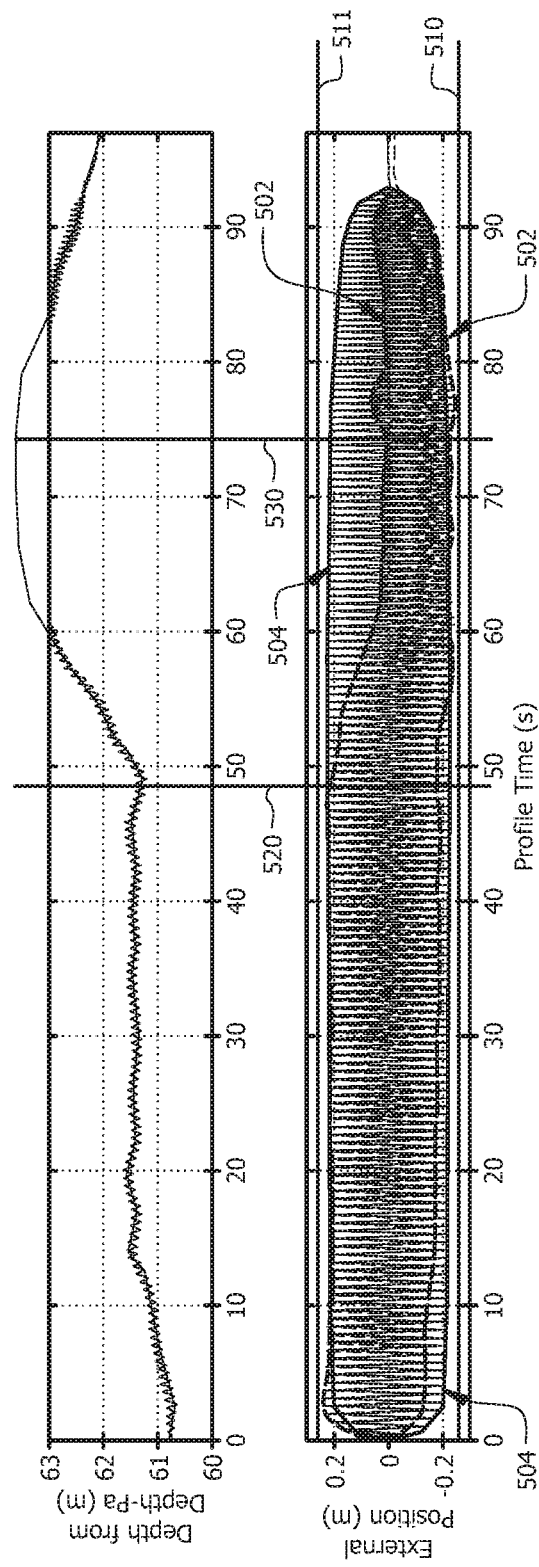
FIGS. 5A and 5B illustrate exemplary depth and oscillation position charts for a resonant seismic source, in accordance with one or more embodiments.

FIGS. 5A and 5B illustrate a real-world example of the effects of depth excursions on the range of motion of the piston 202. As shown in FIG. 5A, the depth of the source 200 can be tracked over time. In some embodiments, the pressure sensor associated with the source 200 can be used to determine the operating depth of the source 200. FIG. 5B illustrates the operational movement range 502 of the piston 202 in comparison with the design movement range 504, e.g., the limits of motion of the piston 202 if the depth had been perfectly controlled over a source activation cycle. The mechanical movement range of the piston 202 can be a distance defined between the inner and outer end stops 240, 242 minus a safety margin. In FIG. 5B the inner and outer mechanical movement ranges are shown by 510 and 511, respectively. FIG. 5B shows a number of excursions outside of the design movement range 504. If the amplitude of motion of the piston oscillation had not been reduced, the piston would have moved beyond the mechanical movement range 510 to 511, triggering a safety shutdown of the source. Note how the piston movement excursions in FIG. 5B are correlated to the depth excursions in FIG. 5A. Initially at time zero, the depth can be shallower than a nominal depth of around 61.75 m in the example of FIGS. 5A and 5B. As shown, the resulting actual movement range moves outwards somewhat beyond the design movement range 504 at the outward end of the oscillations, and approaches the outer mechanical movement range 511 of the piston 202, causing the control system described herein to lower the amplitude from 100% to 90% in response. It is noted that the inward end of the oscillations remains well within the inner mechanical movement range 510. When the operating depth is at or near the nominal depth of 61.75 m, the operational range 502 of the piston 202 remains within the design mechanical range 504, as shown around 40 seconds. Note that because the depth remained slightly shallower than nominal here the control system continued to keep the amplitude at 90% to keep the piston oscillation within bounds. Starting around 48 seconds (indicated by 520), a large depth excursion to a deeper depth of 1-2 m deeper than the nominal depth of 61.75 m begins, resulting in a shift of the piston 202 to an inward position that exceeds the design movement range 504, and if uncorrected, would have gone on to exceed the inner mechanical movement range 510. The overall operating amplitude (e.g., the range between the inward and outward oscillations) can be seen to again decrease, which represents a decrease in the amplitude of the oscillations of the piston 202 to 60% of nominal, which was performed by the control system described herein. Without the amplitude adjustments, a depth excursion of 0.5 to 1 meters and beyond can result in an operational movement range 502 of the piston 202 that can result in the piston 202 shoulder 244 contacting the inner or outer end stop 240, 242.

It can be noted that without any change in the force being applied by the linear actuator 214, the amplitude and/or frequency would remain relatively unchanged during a depth excursion, but the operating position of the pistons 202, 211 would be offset from the nominal range. When operating at or near the maximum amplitude of the source 200, the shift in the operating position can result in the shoulder 244 contacting the inward end stop 240 in the case of an increased depth or the outwards end stop 242 in the case of a decreased depth. Contact in either situation could result in physical damage to the source 200 in extreme cases, but in practice merely causes the operation of the source to stop, necessitating an undesirable and time-consuming restart procedure. Continuing the example in FIG. 5B, about 75 seconds in (indicated by 530) the operator noticed the reduced amplitude and commanded it back up to 100%, but without having corrected the depth excursion first. The control system correctly detected that this was about to cause the piston 202 to exceed the inner movement threshold 510, and within 2.5 seconds it again lowered the amplitude back to a safe level, so that the source continued operating at a lower amplitude level. Within about 30 seconds (after the time period shown here) the tow system fully corrected the depth excursion and the amplitude could be increased back to 90% or 100%. Thus, instead of a time-consuming stop and restart, the only result of this rather large depth excursion was that one source point had a reduced amplitude for about half its extent, and the survey continued without interruption.

Thus, in order to avoid the need for a restart, a control system can be implemented to control the amplitude of the oscillations of the piston 202 to provide a decreased range of motion of the piston 202 to avoid contact between the shoulder 244 and either end stop 240, 242. The control system can be implemented in a number of locations and/or distributed across a plurality of devices.

Returning to FIG. 1, a controller 160 can be used to download control programs to a memory 162, and the controller can be located in one or more of the computing facility 139, a controller aboard the vessel 106, and/or within the source 103. In a preferred embodiment, the controller can be located in a computer system within the source 103. The control program, when initiated, can cause the actuator 214 to deliver an initial impulsive force to the piston shaft 208 to initiate motion of the piston 202 and may thereafter monitor the motion of the piston 202 via the sensor 228 and/or pressure sensors 224, 226. The control program can control the amplitude of the oscillations of the piston 202 by causing the actuator 214 to apply a level of force in the direction of the motion of the shaft 208 to achieve a desired amplitude. The force may be reduced, set to zero, or even inverted in sign from its nominal 100% design value in order to reduce the amplitude and/or shut down the source 200, with the rate of increase or decrease of the amplitudes of the oscillations determined by the magnitude of the force applied.

It can be appreciated that some or all of the aspects of the presently disclosed amplitude control process described herein can be computer-implemented and admits wide latitude in the implementation of these portions and the control system may include software and hardware components. For example, the controller 160 may be any suitable electronic processor or electronic processor set known to the art. Those in the art will appreciate that some types of electronic processors will be preferred in various embodiments depending on familiar implementation-specific details. Factors such as processing power, speed, cost, and power consumption, are commonly encountered in the design process and will be highly implementation specific. Because of their ubiquity in the art, such factors will be easily reconciled by those skilled in the art having the benefit of this disclosure.

Those in the art, having the benefit of this disclosure, will therefore appreciate that the controller 160 may theoretically be an electronic micro-controller, an electronic controller, an electronic microprocessor, an electronic processor set, or an appropriately programmed application specific integrated circuit ("ASIC") or a field programmable gate array ("FPGA"). Some embodiments may even use some combination of these processor types.

The memory 162 may include a hard disk and/or random access memory ("RAM") and/or removable storage. The memory 162 can be encoded with a number of software components, including the control program. It may also be encoded with other software not shown. For example, it may include test software so that the marine seismic source 103 can be interrogated and its settings tested prior to or during deployment. Other kinds of software, such as an operating system, that are not shown may also reside on the memory 162.

Furthermore, there is no requirement that the functionality of the controller 160 described above be implemented as disclosed. For example, the control program may be implemented in some other kind of software component, such as a daemon or utility. The functionality of the control program need not be aggregated into a single component and may be distributed across two or more components.

Note that some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on some form of program storage medium or, alternatively, implemented over some type of transmission medium. The program storage medium may be magnetic (e.g., a floppy disk or a hard drive) or optical (e.g., a compact disc read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The amplitude control technique described above can be practiced during acquisition in a marine seismic survey to control the amplitude of the seismic signals emitted by the resonant seismic source. The design of the survey may be performed in accordance with conventional practice and will typically include one or more tow vessels 106 towing one or more sources.

The control program can generally be configured to reduce the amplitude of the piston, and thereby the seismic signal being produced by the piston 202, upon detecting a depth excursion. The amplitude can be reduced as needed to avoid contact between the shoulder or other physical limit on the piston from contacting an end stop on the housing. In some embodiments, the amplitude can be reduced based on the amount or extent of the depth excursion. In some embodiments, a range of anticipated motion due to a depth excursion can be determined and compared to the mechanical motion range allowed by resonant seismic source. The amplitude can then be controlled as needed to avoid any damage to the device.

Figure 6:
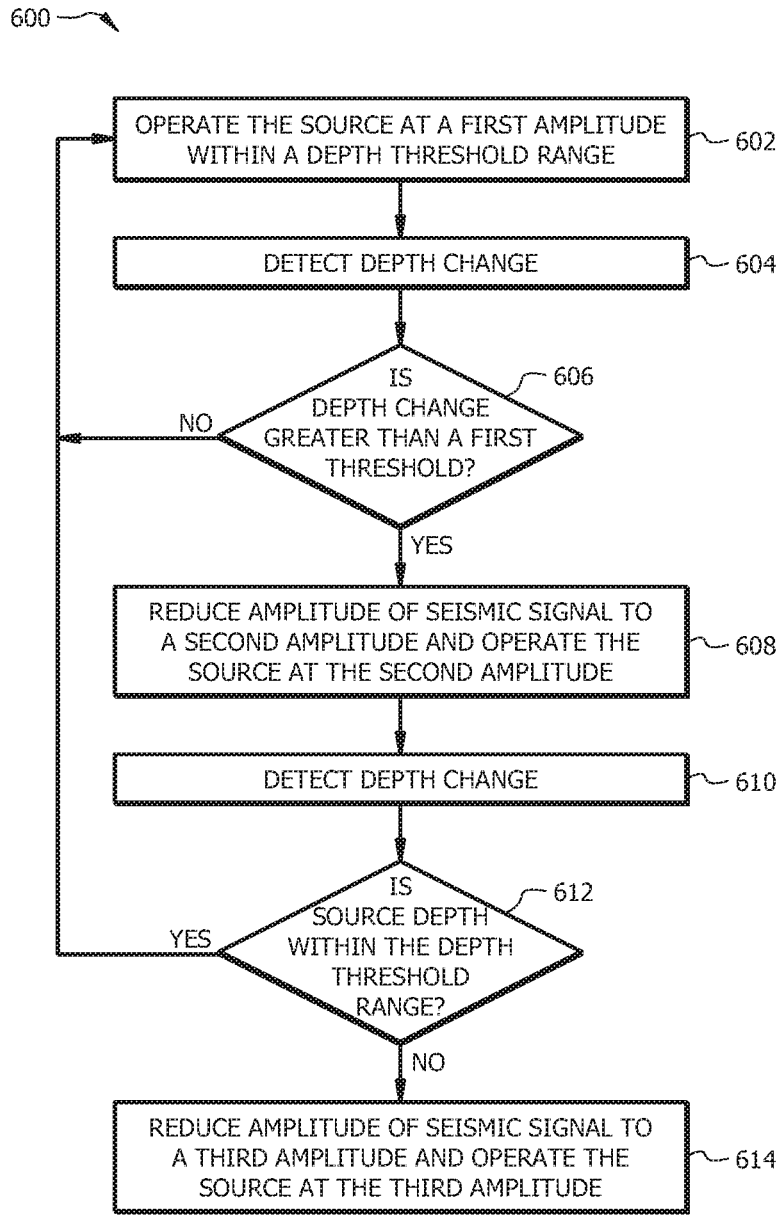
FIG. 6 illustrates a flowchart for an amplitude control process according to some embodiments.

FIG. 6 illustrates an embodiment of an amplitude control process 600 for use with a resonant seismic source. Referring to FIGS. 1, 2, and 6, the resonant seismic source would be deployed as part of a marine seismic survey. As part of the planning for the marine seismic survey, a "source profile" would be designed, which determines the nominal operating depth, baseline 100% linear actuator force level as a function of time, and motion of the squeeze pistons as a function of time (which determines the nominal frequency as a function of time). The source profile would execute repetitively, once per source point. Once positioned at the nominal operating depth, the resonant seismic source would be operated at a first amplitude in step 602. Note the "nominal depth" might need to be adjusted from the source depth specified in the profile design due to, for example, not filling the internal gas inside the source to the correct design pressure, changes in the temperature of the gas (and thus its pressure) after the source was filled, changes in the density of the surrounding water, etc. In practice, the nominal depth is the depth that brings the equilibrium piston position to its design starting position. In general, under good conditions, the first amplitude would be chosen to deliver the maximum amplitude of the resonant seismic source 200, e.g., 100% of the baseline design amplitude level. The baseline design amplitude level should include a safety margin to allow some offset between the shoulder 244 or limit on the piston 202 and the end stops 240, 242. In practice, the first amplitude may not be 100% of the source profile design amplitude, but may be reduced based on the current operating characteristics of the resonant seismic source, the current sea state, the recent performance of the towing system, etc. For example, the first amplitude may result in a range of motion of the piston 202 that is between about 70% and 100%, or between about 85% and about 99% of the range of motion allowed by the end stops 240, 242.

During operation, a change in the depth can be detected in step 604. The depth can be detected using any suitable sensor such as a pressure sensor 226 associated with the resonant seismic source 200. While described as using a pressure sensor, any suitable sensor capable of being used to determine the depth of the resonant seismic source 200 can be used to determine the depth. With one or more embodiments of the present invention, what matters is not the absolute depth, but the difference between the current depth and the depth that causes the limits of the piston motion to track the motion limits of the design source profile. Thus, in some embodiments the position sensor 228, which directly measures the motion of the piston 202, can be used to infer the sign and magnitude of the depth error. In some embodiments, both the position sensor and pressure sensors would be used.

It is expected that the depth of the resonant seismic source 200 will change to some degree during normal operation, for example, due to heave of the tow vessel 106. Minor changes to the depth may not significantly affect the range of motion of the piston 202 relative to the housing 220. A threshold that can represent a depth threshold range can be used to determine when the amplitude of the piston 202 should be adjusted to avoid damaging the resonant seismic source 200. The threshold may be selected depending on the safety margin, characteristics of the resonant seismic source, operating conditions, and the like. For example, when a higher safety margin is used, the depth threshold range may represent a larger range of acceptable operating depths. In some embodiments, the threshold may represent a distance in the range of about 0.1 m, about 0.2 m, about 0.3 m, about 0.4 m, or about 0.5 m above and below the nominal or selected operating depth. If it is known that the seas are likely to be rough, or that the towing system has not been performing well, that information can be incorporated into the source profile design, and a "stiffer" profile can be designed that is less affected by depth errors. In that case, the threshold may represent a larger distance, in the range of 1-2 meters.

In step 606, the depth change can be compared to the first threshold that can be used to define the depth threshold range. If the depth change is greater than the first threshold, above or below the nominal operating depth, then in step 608 the control process can modify the forces applied by the linear actuator 214 so as to reduce the amplitude of the oscillation of the piston 202, and thereby the amplitude of the seismic signal being generated, from the first amplitude as necessary to reduce the range of motion of the piston 202 relative to the housing 220 so that it remains within bounds. The amount of the reduction in the amplitude can be based on a number of factors including the selection of the threshold amount, an anticipated change in the operating motion of the piston 202 relative to the housing 220 for a given depth change, an anticipated continued change in the depth, and the like. In some embodiments, the amplitude can be reduced by at least about 5%, at least about 10%, or at least about 20%. In a preferred embodiment, every time the motion of the piston 202 approaches within a set threshold distance of a predefined set of bounds, the amplitude can be reduced by 10%. Since the seismic survey can continue to occur while the amplitude control program is operating, the amplitude generally should be maintained as high as possible without risking damage to the resonant seismic source or a safety shutdown. As a result, the amplitude may be reduced less than about 40%, less than about 30%, or less than about 25%. Once the amplitude is reduced to the second amplitude, the resonant seismic source 200 can continue to operate at the reduced amplitude level in step 608.

If it is determined that the depth change detected in step 604 is not greater than the threshold amount in step 606, then the process can return to step 602 in which the resonant seismic source 200 continues to be operated at the first amplitude. The process can then continue to monitor the depth of the resonant seismic source until a depth change that exceeds the first threshold is detected in step 606.

When the resonant seismic source 200 is operated at the second amplitude, the piston 202 can be prevented from contacting at least one of the first end stop or the second end stop due to the reduction in the amplitude of the piston. The depth can continue to be monitored while the resonant seismic source 200 is operated at the second amplitude. When a depth change is detected in step 610, the resulting depth change can either result in a further depth excursion of the resonant seismic source 200 or correct the earlier depth excursion. The resulting depth change can then be compared to the original depth threshold range (e.g., the nominal operating depth plus or minus the first threshold) in step 612. If the depth after the depth change is within the depth threshold range, the amplitude can be increased from the second amplitude. This step can be manual or automated by the control system. In some embodiments, this can represent a correction of the depth excursion to within a threshold amount of the nominal operating depth, whereby the amplitude can be corrected and increased to resume normal acquisition of the seismic survey. While the amplitude can be increased, it may not be immediately returned to the first amplitude. In some embodiments, the amplitude may be increased based on being within the depth threshold range, but may not be returned to the first amplitude for a given time period to allow for the resonant seismic source to stabilize after a depth excursion. In some embodiments, the amplitude of the resonant seismic source can be increased above the first amplitude, depending on the level at which the first amplitude is initially selected.

In the event that the depth change detected in step 610 represents a further depth excursion such that the depth of the resonant seismic source is not within the depth threshold range in step 612, the amplitude of the piston 202 can be further reduced to a third amplitude that is less than the second amplitude. In some embodiments, the amplitude may be further reduced by the same amount as it is reduced from the first threshold to the second threshold, however, the second reduction can be more or less than the first reduction. In general, the resonant seismic device 200 will continue to operate, but with a further reduced amplitude. The resonant seismic device can then be operated at the third amplitude in step 614. The continued operation may allow for the resonant seismic source to be returned to an increased amplitude faster than if the resonant seismic source is entirely shut down, even if the amplitude is insufficient for some portion of the seismic survey.

Additional, optional steps can be taken after step 614. In some embodiments, an alarm can be generated if the depth excursion continues to worsen. The alarm may alert the operator on the tow vessel 106 that a depth excursion is occurring and allow for operator intervention. In the event that the depth excursion will worsen, the resonant seismic source 200 can be shut down by the operator in response to the alarm.

In some embodiments, the depth of the resonant seismic source 200 can continue to be monitored. Should the depth excursion be corrected, the amplitude can be returned to the first amplitude, the second amplitude, or any amplitude between the first and second amplitudes. Should the depth excursion continue to worsen, the control program can continue to reduce the amplitude of the piston 202, until a lower amplitude threshold is reached. Once reached, the amplitude control program can automatically shut down the resonant seismic source in order to prevent damage to the device. Once the reason for the depth excursion is resolved, the device can be restarted in order to resume the seismic survey.

Figure 7:
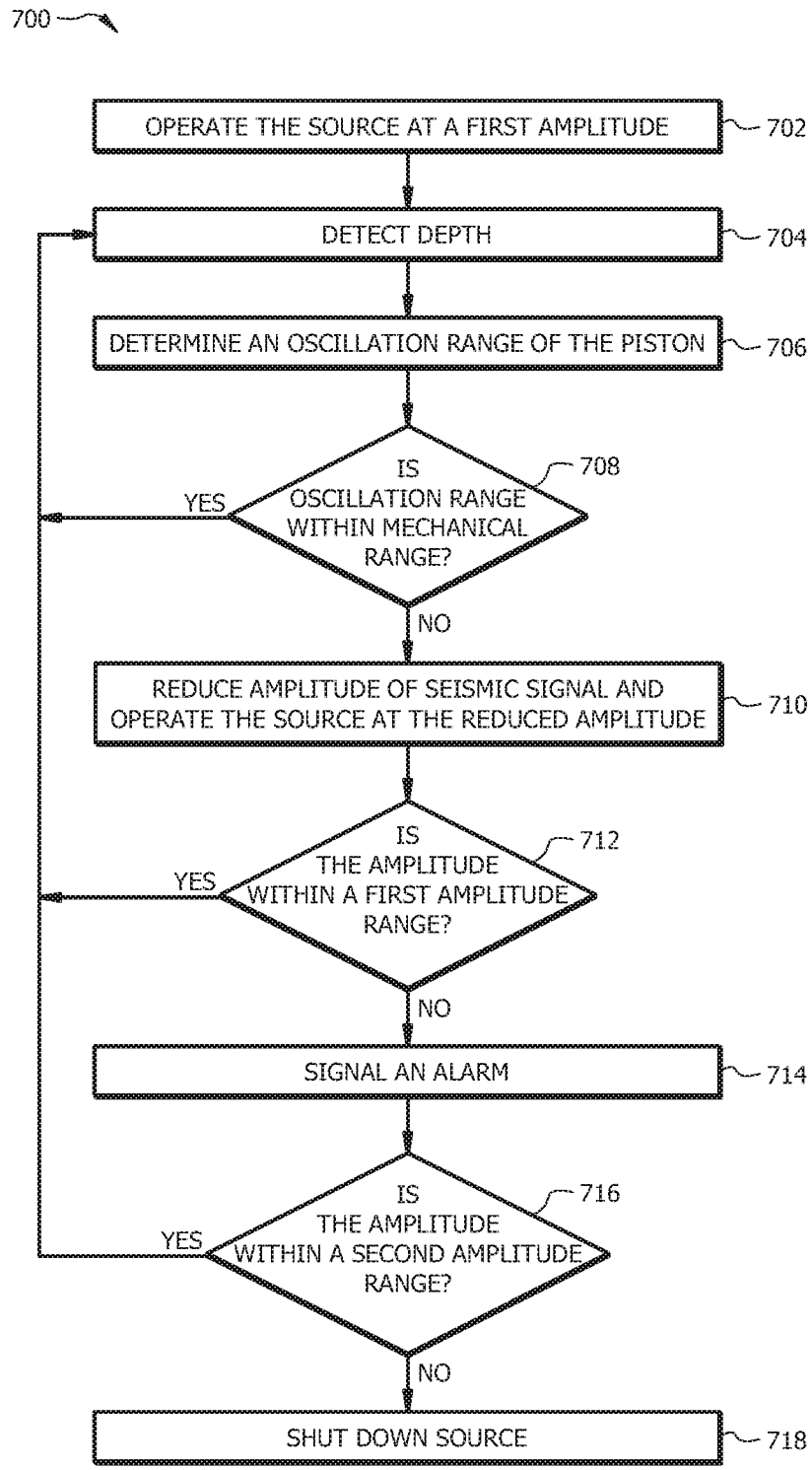
FIG. 7 illustrates a flowchart for another amplitude control process according to some embodiments.

FIG. 7 illustrates another embodiment of an amplitude control process. This embodiment is similar to the amplitude control process described with respect to FIG. 6, and similar elements can be the same as those described with respect to FIG. 6. For example, the resonant seismic source can be deployed as part of a marine seismic survey. Once positioned at the nominal operating depth, the resonant seismic source can be operated at a first amplitude in step 702. The first amplitude can be selected based on any of the operating characteristics of the resonant seismic source described with respect to FIG. 6 and be within any of the ranges described with respect to FIG. 6.

During operation, the depth can be detected in step 704. The depth can be detected using any suitable sensor such as a pressure sensor 226 associated with the resonant seismic source 200. While described as using a pressure sensor, any suitable sensor capable of being used to determine the depth of the resonant seismic source 200 can be used to determine the depth. In particular, in some embodiments the position sensor 228 would be used to directly monitor the motion of the piston 202, and determine the depth deviation from the observed motion.

Once the depth of the resonant seismic source 200 is determined, or when a change in depth is determined, a range of motion of the piston 202 can be determined in step 706. The range of motion can include the oscillation range of the piston in terms of its overall travel and/or the relative positioning of the piston 202 during its oscillations with respect to the housing 220. The range of motion can also be determined more directly, based on the signal from the position sensor 228, without calculating the depth. It could also be determined indirectly from the external pressure, the internal pressure, the temperature of the resonant seismic source, the pressure within the chambers 231, 232, and/or the position of the squeeze pistons 209, 210. In some embodiments, a correlation or historical data can be used to determine the oscillation range of the piston 202 relative to the housing 220 using the determined depth of the resonant seismic source 200.

Once the oscillation range of the piston 202 relative to the housing 220 is known, the oscillation range can be compared to the mechanical range of the resonant seismic source 200 in step 708. The mechanical range can take a safety margin into account and may be less than the physical distance between the end stops 240, 242. If the oscillation range of the piston 202 is within the mechanical range of the resonant seismic source 200, then the piston 202 will not engage the end stops 240, 242, and the method can return to step 704 to continue to monitor the operation of the resonant seismic source for depth/pressure/center of oscillation changes.

When the determined oscillation range is not within the mechanical range of the resonant seismic source 200, the shoulder 244 can engage one of the end stops 240, 242. Such interaction can damage the resonant seismic source 200, and as a result, the control process can reduce the amplitude of motion of the piston 202, and thereby the amplitude of the seismic signal being generated, in step 710. The reduction in the amplitude can be based on a number of factors including the selection of the safety margin in the determination of the mechanical range of the resonant seismic source 200, an anticipated change in the operating motion of the piston 202 relative to the housing 220 for a given depth change, an anticipated continued change in the depth, and the like. In some embodiments, the amplitude can be reduced by at least about 5%, at least about 10%, at least about 20%, or at least about 30% such that the resulting reduced amplitude can be between about 70% and 95% of the original amplitude.

Since the seismic survey can continue to occur while the amplitude control program is operating, the amplitude may be maintained as high as possible without causing damage to the resonant seismic source 200. As a result, the amplitude may be reduced less than about 40%, less than about 30%, or less than about 25%. Once the amplitude is reduced, the resonant seismic source 200 can continue to operate at the reduced amplitude level in step 710.

The resulting reduced amplitude can then be compared to a first amplitude range defined by a lower or alarm threshold in step 712. The amplitude control process can automatically reduce the amplitude iteratively to protect the resonant seismic source 200 from damage. At a certain amplitude reduction, an alert can be sent to the operator to indicate that the amplitude has fallen below an alarm threshold such that the resonant seismic source 200 is operating within a first amplitude range below the alarm threshold. The alarm threshold can correspond to an amplitude level at a defined reduction from the maximum operating amplitude of the resonant seismic source 200. As the amplitude control program continues to reduce the amplitude level, the alarm threshold can be used to alert an operator to the reduction in the amplitude. If the reduced amplitude has not yet fallen below the alarm threshold (e.g., the amplitude is still above the alarm threshold), then the process can return to step 704 to continue to monitor the depth of the resonant seismic source. When the reduced amplitude falls below the alarm threshold and is operating within the first amplitude range, then the process can pass to step 714 and an alarm can be generated. The alarm can provide an indication to the operator that the amplitude is at a reduced level that warrants triggering an alarm. The alarm can be sent using any appropriate means and may be sent, for example, to the tow vessel 106 to allow the depth control to be adjusted to correct the depth excursion. After this has been done, the amplitude can be increased back to the first amplitude. Note that at any point the operator may also choose to manually raise the amplitude back to 100%, or 90%, or whatever value has proven to work reliably in practice given the sea state, tow speed, etc, even in the absence of an alarm, and return the process flow back to the initial state at step 702.

Additional threshold levels can be used to perform various actions. For example, when the amplitude control process reduces the amplitude level such that the amplitude falls further below a second amplitude threshold (e.g., a shutdown threshold), the resonant seismic source may be operating within a second amplitude range. The passing of this second amplitude threshold may be an indication that the piston is approaching the mechanical range due to an extended depth excursion and/or that the amplitude is insufficient to generate a useful signal. In either situation, the device 200 may need to be shut down to avoid damage to the device 200 and/or to allow the continued depth excursion to be corrected. As such, once the alarm is generated in step 714, the resulting reduced amplitude can be compared to the second amplitude threshold in step 716. As mentioned above, this second threshold can represent a level at which the system should shut down the device 200. If the reduced amplitude has not yet fallen below the second threshold amount (e.g., where the resonant seismic source is operating within the second amplitude range), then the process can return to step 704 to continue to monitor the depth of the resonant seismic source 200. When the reduced amplitude falls below the second amplitude threshold amount, then the process can pass to step 718 and the source can be shut down. The source generally will also be immediately shut down whenever the piston motion approaches the limits closer than some pre-determined safety margin, regardless of any other state of the device.

Additional, optional steps are possible within the method 700. For example, the process 700 is generally described with respect to reducing the amplitude of the piston in order to prevent contact between the piston 202 with one or more of the end stops 240, 242. The process can be configured to automatically restore or increase the amplitude when the depth excursion is corrected. For example, in step 708 when the oscillation range is within the mechanical range, a timer or depth reading can be used to automatically increase the amplitude of the source 200 incrementally or back to the first amplitude. In some embodiments, the maximum amplitude within a given depth excursion can be determined and the amplitude of the source 200 can be adjusted based on this maximum amplitude value. As the depth of the source is corrected from a depth excursion, the amplitude could then automatically be returned based on the determined maximum amplitude value.

The amplitude control processes described herein can be used to control the amplitude of the seismic source based on factors such as the motion of the piston and/or a detected depth of the source. This process can be used alone with a manual depth control or the amplitude control process can be integrated with the depth control of the source on the tow vessel. In some embodiments, the detection of the depth change can be transmitted to the depth control, and the depth control can use the detected depth change to adjust the depth of the source.

In some embodiment, the tow vessel 106 comprises a winch, a heave compensation system, and a lift that displaces the tow line and/or umbilical over the side of the vessel. The winch is used to control the length of line available to tow the source 200, and the heave compensation system adjusts the line for changes due to wave motion. The winch and/or the heave compensation system can be controlled to adjust the depth of the source. In some embodiments, the amplitude control process can be integrated with and/or control the winch and/or the heave compensation system to correct for depth excursions that occur while also adjusting the amplitude of the source to prevent damage to the source while the depth excursion is being corrected. Such a fully integrated solution is within the scope of this disclosure.

Having described various systems and methods, certain aspects can include, but are not limited to:

In a first embodiment, a method of seismic exploration above a region of the subsurface of the earth containing structural or stratigraphic features conducive to the presence, migration, or accumulation of hydrocarbons, the method comprises: setting a tow depth of a resonant seismic source; producing a resonant frequency at a first amplitude with the resonant seismic source at the tow depth, wherein the resonant seismic source comprises a mass moving between a first end stop and a second end stop at a first amplitude; detecting a depth excursion from the tow depth; reducing an amplitude of the mass from the first amplitude to a second amplitude; preventing the mass from contacting at least one of the first end stop or the second end stop based on reducing the amplitude to the second amplitude; correcting the depth excursion to return the resonant seismic source to the tow depth; and increasing the amplitude from the second amplitude to produce the resonant frequency with the resonant seismic source at the tow depth.

A second embodiment can include the method of the first embodiment, wherein the resonant seismic source comprises a gas spring piston, and wherein the mass is a piston of the gas spring piston.

A third embodiment can include the method of the first or second embodiment, wherein the resonant seismic source comprises an adjustable squeeze piston assembly.

A fourth embodiment can include the method of any one of the first to third embodiments, wherein the resonant seismic source comprises an excitation actuator, and wherein reducing an amplitude of the mass comprises controlling the excitation actuator to reduce an energy input in the mass.

A fifth embodiment can include the method of any one of the first to fourth embodiments, further comprising: receiving an indication of the depth excursion at a depth controller on a tow vessel, wherein the tow vessel is coupled to the resonant seismic source; and correcting the tow depth based on the indication of the depth excursion.

A sixth embodiment can include the method of any one of the first to fifth embodiments, wherein the second amplitude is between 70% and 95% of the first amplitude.

A seventh embodiment can include the method of any one of the first to sixth embodiments, further comprising: generating an alarm in response to reducing the amplitude from the first amplitude to the second amplitude.

An eighth embodiment can include the method of any one of the first to seventh embodiments, further comprising: comparing the depth excursion with a depth threshold; determining that the depth excursion exceeds the depth threshold; and shutting down the resonant seismic source in response to the depth excursion exceeding the depth threshold.

A ninth embodiment can include the method of any one of the first to eighth embodiments, wherein the resonant seismic source comprises an external pressure sensor, and wherein detecting the depth excursion comprises: detecting a pressure reading from the external pressure sensor; and determining a depth of the resonant seismic source based on the pressure reading.

A tenth embodiment can include the method of any one of the first to ninth embodiments, further comprising: continuously recording seismic data while decreasing the amplitude and increasing the amplitude.

An eleventh embodiment can include the method of any one of the first to tenth embodiments, wherein the resonant frequency is a frequency at or below about 8 Hz.

In a twelfth embodiment, a computer implemented control method for a resonant seismic source, the method comprises: receiving, by a controller, pressure readings from a pressure sensor coupled to a resonant seismic source, wherein the resonant seismic source is towed in a marine environment; determining, by the controller, a depth of the resonant seismic source based on the pressure readings, wherein the depth is within a depth threshold range; determining, by the controller, a change in the depth of the resonant seismic source to a depth outside of the depth threshold range; reducing, by the controller, an amplitude of a resonant frequency produced by the resonant seismic source in response to determining that the depth of the resonant seismic source is outside of the depth threshold range; determining, by the controller, a second change in the depth of the resonant seismic source from the depth outside of the depth threshold range to a depth within the depth threshold range; and increasing the amplitude of the resonant frequency produced by the resonant seismic source in response to determining the second change in the depth of the resonant seismic source.

A thirteenth embodiment can include the method of the twelfth embodiment, wherein the resonant seismic source comprises a gas spring piston, wherein the method further comprises: preventing the piston from contacting at least one of a first end stop or a second end stop based on reducing the amplitude of the resonant frequency.

A fourteenth embodiment can include the method of the thirteenth embodiment, wherein the resonant seismic source comprises an excitation actuator, and wherein reducing an amplitude of the resonant frequency comprises controlling the excitation actuator to reduce an energy input in the piston.

A fifteenth embodiment can include the method of any one of the twelfth to fourteenth embodiments, wherein reducing the amplitude of the resonant frequency comprises reducing the amplitude by an amount between 5% and 30%.

A sixteenth embodiment can include the method of any one of the twelfth to fifteenth embodiments, further comprising: generating an alarm in response to reducing the amplitude.

A seventeenth embodiment can include the method of any one of the twelfth to sixteenth embodiments, further comprising: continuously recording seismic data while reducing the amplitude and increasing the amplitude.

An eighteenth embodiment can include the method of any one of the twelfth to seventeenth embodiments, wherein the resonant frequency is a frequency at or below about 8 Hz.

In a nineteenth embodiment, a method of seismic exploration above a region of the subsurface of the earth containing structural or stratigraphic features conducive to the presence, migration, or accumulation of hydrocarbons, the method comprises: producing a resonant frequency at a first amplitude with the resonant seismic source at a tow depth, wherein the resonant seismic source comprises a piston moving within a mechanical movement range of the resonant seismic source between a first end stop and a second end stop; detecting a depth excursion from the tow depth; determining an oscillation range of the piston based on the depth change; determine that the oscillation range exceeds the mechanical movement range; reducing an amplitude of the piston from the first amplitude to a second amplitude in response to determining that the oscillation range exceeds the mechanical movement range; preventing the mass from contacting at least one of the first end stop or the second end stop based on reducing the amplitude to the second amplitude; correcting the depth excursion to return the resonant seismic source to the tow depth; and increasing the amplitude from the second amplitude to produce the resonant frequency with the resonant seismic source at the tow depth.

A twentieth embodiment can include the method of the nineteenth embodiment, wherein the oscillation range of the piston defines an overall travel of the piston, a travel position of the piston relative to the first end stop and the second end stop, or both.

A twenty first embodiment can include the method of the nineteenth or twentieth embodiment, wherein determining the oscillation range comprises detecting a travel position of the piston using a position sensor within the resonant seismic source.

A twenty second embodiment can include the method of any one of the nineteenth to twenty first embodiments, further comprising: comparing the second amplitude to an amplitude threshold; determining that the second amplitude exceeds the amplitude threshold; and generating an alarm based on determining that the amplitude exceeds the amplitude threshold.

A twenty third embodiment can include the method of the twenty second embodiment, further comprising: comparing the second amplitude to a second amplitude threshold; determining that the second amplitude exceeds the second amplitude threshold; and shutting down the resonant seismic source based on determining that the second amplitude exceeds the second amplitude threshold.

A twenty fourth embodiment can include the method of any one of the nineteenth to twenty third embodiments, further comprising: receiving an indication of the depth excursion at a depth controller on a tow vessel, wherein the tow vessel is coupled to the resonant seismic source; and correcting the tow depth based on the indication of the depth excursion.

A twenty fifth embodiment can include the method of any one of the nineteenth to twenty fourth embodiments, further comprising: continuously recording seismic data while decreasing the amplitude and increasing the amplitude.

A twenty sixth embodiment can include the method of any one of the nineteenth to twenty fifth embodiments, wherein the resonant frequency is a frequency at or below about 8 Hz.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Numerous other modifications, equivalents, and alternatives, will become apparent to those skilled in the art once the above disclosure is fully appreciated. It is intended that the following claims be interpreted to embrace such modifications, equivalents, and alternatives where applicable. Accordingly, the scope of protection is not limited by the description set out above but is only limited by the claims which follow, that scope including equivalents of the subject matter of the claims.

What is claimed is:

1. A method of seismic exploration above a region of the subsurface of the earth containing structural or stratigraphic features conducive to the presence, migration, or accumulation of hydrocarbons, the method comprising:
    setting a tow depth of a resonant seismic source;
    producing a resonant frequency at a first amplitude with the resonant seismic source at the tow depth, wherein the resonant seismic source comprises a mass moving between a first end stop and a second end stop at a first amplitude;
    detecting a depth excursion from the tow depth;
    determining a second amplitude by which to reduce the first amplitude of the mass based on the depth excursion from the tow depth;
    reducing the first amplitude of the mass by the second amplitude, to obtain a reduced amplitude and to prevent the mass from contacting at least one of the first end stop or the second end stop;
    correcting the depth excursion to return the resonant seismic source to the tow depth;
    determining a third amplitude by which to increase the reduced amplitude of the mass based on the tow depth; and
    increasing the reduced amplitude by the third amplitude to produce the resonant frequency with the resonant seismic source at the tow depth.

2. The method of claim 1, wherein the resonant seismic source comprises a gas spring piston, and wherein the mass is a piston of the gas spring piston.

3. The method of claim 1, wherein the resonant seismic source comprises an adjustable squeeze piston assembly.

4. The method of claim 1, wherein the resonant seismic source comprises an excitation actuator, and wherein reducing the first amplitude of the mass comprises controlling the excitation actuator to reduce an energy input in the mass.

5. The method of claim 1, further comprising:
    receiving an indication of the depth excursion at a depth controller on a tow vessel, wherein the tow vessel is coupled to the resonant seismic source; and
    correcting the tow depth based on the indication of the depth excursion.

6. The method of claim 1, wherein the reduced amplitude is between 70% and 95% of the first amplitude.

7. The method of claim 1, further comprising:
    generating an alarm in response to reducing the first amplitude by the second amplitude.

8. The method of claim 1, further comprising:
    comparing the depth excursion with a depth threshold;
    determining that the depth excursion exceeds the depth threshold; and
    shutting down the resonant seismic source in response to the depth excursion exceeding the depth threshold.

9. The method of claim 1, wherein the resonant seismic source comprises an external pressure sensor, and wherein detecting the depth excursion comprises:
    detecting a pressure reading from the external pressure sensor; and
    determining a depth of the resonant seismic source based on the pressure reading.

10. The method of claim 1, further comprising:
continuously recording seismic data while decreasing the amplitude and increasing the amplitude.

11. The method of claim 1, wherein the resonant frequency is a frequency at or below about 8 Hz.

12. A computer implemented control method for a resonant seismic source, the method comprising:
receiving, by a controller, pressure readings from a pressure sensor coupled to a resonant seismic source, wherein the resonant seismic source is towed in a marine environment;
determining, by the controller, a depth of the resonant seismic source based on the pressure readings, wherein the depth is within a depth threshold range;
determining, by the controller, a first change in the depth of the resonant seismic source to a depth outside of the depth threshold range;
determining, by the controller, a first amplitude by which to reduce a resonant frequency produced by the resonant seismic source based on the first change in the depth of the resonant seismic source;
reducing, by the controller, an amplitude of the resonant frequency produced by the resonant seismic source by the first amplitude, to obtain a reduced amplitude in response to determining the first amplitude of the resonant frequency produced by the resonant seismic source;
determining, by the controller, a second change in the depth of the resonant seismic source from the depth outside of the depth threshold range to a depth within the depth threshold range;
determining, by the controller, a second amplitude by which to increase the resonant frequency produced by the resonant seismic source based on the second change in depth of the resonant seismic source; and
increasing the reduced amplitude of the resonant frequency produced by the resonant seismic source, to obtain an increased amplitude, in response to determining the second amplitude by which to increase the resonant frequency produced by the resonant seismic source.

13. The method of claim 12, wherein the resonant seismic source comprises a piston, wherein the method further comprises:
preventing the piston from contacting at least one of a first end stop or a second end stop by reducing the amplitude of the resonant frequency.

14. The method of claim 13, wherein the resonant seismic source comprises an excitation actuator, and wherein reducing the amplitude of the resonant frequency comprises controlling the excitation actuator to reduce an energy input in the piston.

15. The method of claim 12, wherein reducing the amplitude of the resonant frequency comprises reducing the amplitude by an amount between 5% and 30%.

16. The method of claim 12, further comprising:
generating an alarm in response to reducing the amplitude.

17. The method of claim 12, further comprising:
continuously recording seismic data while reducing the amplitude and increasing the amplitude.

18. The method of claim 12, wherein the resonant frequency is a frequency at or below about 8 Hz.

19. A method of seismic exploration above a region of the subsurface of the earth containing structural or stratigraphic features conducive to the presence, migration, or accumulation of hydrocarbons, the method comprising:
producing a resonant frequency at a first amplitude with a resonant seismic source at a tow depth, wherein the resonant seismic source comprises a piston moving within a mechanical movement range of the resonant seismic source between a first end stop and a second end stop;
detecting a depth excursion from the tow depth;
determining an oscillation range of the piston based on the depth excursion;
determine that the oscillation range exceeds the mechanical movement range;
determining a second amplitude by which to reduce the first amplitude of the piston based on the depth excursion from the tow depth;
reducing the first amplitude of the piston by the second amplitude to obtain a reduced amplitude in response to determining that the oscillation range exceeds the mechanical movement range; to prevent the mass from contacting at least one of the first end stop or the second end stop;
correcting the depth excursion to return the resonant seismic source to the tow depth;
determining a third amplitude by which to increase the reduced amplitude of the piston based on the tow depth; and
increasing the reduced amplitude by the third amplitude to produce the resonant frequency with the resonant seismic source at the tow depth.

20. The method of claim 19, wherein the oscillation range of the piston defines an overall travel of the piston, a travel position of the piston relative to the first end stop and the second end stop, or both.

21. The method of claim 19, wherein determining the oscillation range comprises detecting a travel position of the piston using a position sensor within the resonant seismic source.

22. The method of claim 19, further comprising:
comparing the reduced amplitude to an amplitude threshold;
determining that the reduced amplitude exceeds the amplitude threshold; and
generating an alarm based on determining that the reduced amplitude exceeds the amplitude threshold.

23. The method of claim 22, further comprising:
comparing the reduced amplitude to a second amplitude threshold;
determining that the reduced amplitude exceeds the second amplitude threshold; and
shutting down the resonant seismic source based on determining that the reduced amplitude exceeds the second amplitude threshold.

24. The method of claim 19, further comprising:
receiving an indication of the depth excursion at a depth controller on a tow vessel, wherein the tow vessel is coupled to the resonant seismic source; and
correcting the tow depth based on the indication of the depth excursion.

25. The method of claim 19, further comprising:
continuously recording seismic data while decreasing the amplitude and increasing the amplitude.

26. The method of claim 19, wherein the resonant frequency is a frequency at or below about 8 Hz.

* * * * *